UNITED STATES PATENT OFFICE.

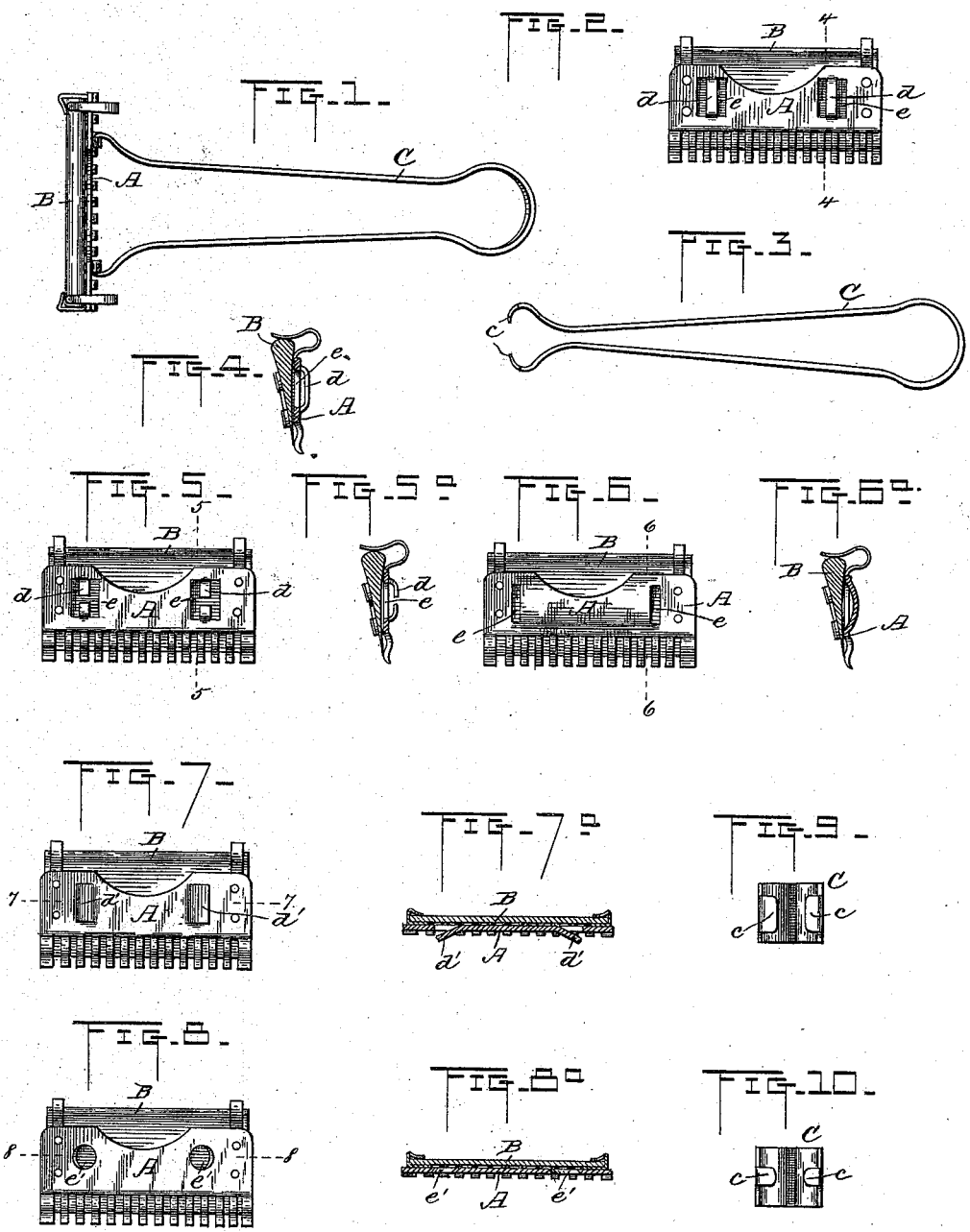

JOSEPH TURNER, OF WORCESTER, MASSACHUSETTS, ASSIGNOR TO THE
J. R. TORREY RAZOR COMPANY, OF SAME PLACE.

SAFETY-RAZOR.

SPECIFICATION forming part of Letters Patent No. 400,418, dated March 26, 1889.

Application filed August 20, 1888. Serial No. 283,210. (No model.)

*To all whom it may concern:*

Be it known that I, JOSEPH TURNER, a citizen of the United States, residing at Worcester, in the county of Worcester and State of Massachusetts, have invented certain new and useful Improvements in Safety-Razors, of which the following is a specification, reference being had therein to the accompanying drawings.

My invention relates to that form of "safety-razor" shown by my patent, No. 370,506, dated September 27, 1887, the object of the present invention being to provide a convenient safety-razor of such construction that it will pack in a smaller compass than the razors shown by my said patent. To this end I provide the blade-holding guard-plate inside of its outer ends, at its back, with ears or recesses, which are to be entered by inwardly-turned lips on the spring-arms of the detachable handle, so that the latter need not be made so wide as the handles of the safety-razors shown by my patent above referred to, and is therefore adapted to be packed into a comparatively small box for convenience of transportation.

In the drawings, Figure 1 is a plan view of one form of my improved safety-razor with the handle attached. Fig. 2 is a rear elevation of the same without the handle. Fig. 3 is a plan view of the detachable handle. Fig. 4 is a section on line 4 4, Fig. 2. Figs. 5, 6, 7, and 8 are rear elevations of other forms of my invention. Fig. 5$^a$ is a section on line 5 5, Fig. 5; Fig. 6$^a$, a section on line 6 6, Fig. 6; Fig. 7$^a$, a section on line 7 7, Fig. 7; and Fig. 8$^a$, a section on line 8 8, Fig. 8. Figs. 9 and 10 are end views of different forms of handles to show the inwardly-turned holding-lips.

A denotes the blade-holding guard-plate, having at its lower edge the usual guard-teeth and at its ends lips for holding the blade B, said plate having also pivoted spring-latches for removably holding the blade in place, all substantially as shown by my patent aforesaid. The plate A is provided at its back, inside of its outer ends, with holding devices, consisting of ears or recesses to be engaged by the inwardly-turned lips $c$ of the spring-handle C. In the form of my invention more particularly shown by Figs. 2 and 4, these holding devices are merely thin ribs $d$, formed by cutting slots $e$ in the plate A on each side of them and then striking out or bending the said ribs backward slightly, so that they can readily be engaged by the lips $c$ of the handle. The holding devices shown by Figs. 5 and 5$^a$ differ only from those shown by Figs. 2 and 4 in that the ribs $d$ are split crosswise to facilitate striking them out.

In the form of my invention shown by Figs. 6 and 6$^a$ the metal of the plate A, between the slots $e$, is rounded out, so that the lips of the handle C can readily grasp said plate.

In the modifications shown by Figs. 7 and 7$^a$ the holding-ears $d'$ are formed in the plate A simply by cutting out said lips from said plate and bending them back slightly, as shown in Fig. 7$^a$, so that the lips $c$ of the handle can catch under their outer ends.

In the form of my invention shown in Figs. 8 and 8$^a$ the plate A is simply provided with holes $e'$, to be entered by the ears $c$ of the handle, the metal at both sides of said holes being preferably beveled, as shown in Fig. 8$^a$, so that the said ears can be more readily engaged with or disengaged from the plate A, the ears $c$ of the handle to be used with this form of my invention being made narrow to enter said holes $e'$, as shown in Fig. 10, but the lips of the handles to be used with the other forms of my invention being made somewhat wider, as shown by Fig. 9.

It will be observed that with all of these different forms of my invention the holding ears or recesses at the back of the blade-holding guard-plates A, to be engaged or entered by the inwardly-turned lips of the handles C, are within the ends of the said plates, so that comparatively narrow handles, normally springing together, as shown in Fig. 3, can be employed, said handles being thus adapted to be packed into closer compass (so that the razors may be packed into smaller boxes) than the handles of the razors shown by my former patent hereinbefore referred to.

Having thus described my invention, I claim and desire to secure by Letters Patent—

In a safety-razor, the combination, with a spring-handle having inwardly-turned lips $c$, of a blade-holding guard-plate, A, provided in its rear side, between its ends, with ears or recesses to be engaged by the said lips, substantially as set forth.

In testimony whereof I affix my signature in presence of two witnesses.

JOSEPH TURNER.

Witnesses:
 E. H. H. WILSON,
 WILLIAM TURNER.